United States Patent [19]

Peter

[11] 4,354,769
[45] Oct. 19, 1982

[54] DUAL COUNTERACTING HUB-TO-SHAFT CLAMP CONNECTION

[76] Inventor: Oskar E. Peter, Scloss-Strasse 9/1, D-7129 Brackenheim, Fed. Rep. of Germany

[21] Appl. No.: 222,156

[22] Filed: Jan. 2, 1981

[30] Foreign Application Priority Data

Apr. 10, 1980 [DE] Fed. Rep. of Germany ....... 3013874

[51] Int. Cl.³ .............................................. F16D 1/06
[52] U.S. Cl. .................................. 403/248; 403/277; 403/370; 403/374
[58] Field of Search ............... 403/374, 371, 370, 248, 403/277, 369

[56] References Cited

U.S. PATENT DOCUMENTS 3,957,381 5/1976 Schafer ........................... 403/374 X

FOREIGN PATENT DOCUMENTS 2026650 2/1980 United Kingdom ................ 403/374

Primary Examiner—Andrew V. Kundrat
Attorney, Agent, or Firm—Frishauf, Holtz, Goodman & Woodward

[57] ABSTRACT

To permit acceptance of diametrically directed clamping forces of a double-acting hub-to-shaft clamping connection in which an inner ring is formed with outer conical surfaces, an outer ring formed with inner conical surfaces, and clamping or compression rings with matching conical surfaces are positioned between the conical surfaces of the inner and outer ring, a circumferentially continuous cylindrical metal ring is provided formed with a circumferential groove fitted either over (FIG. 2) the outer ring, or within (FIG. 3) the inner ring to permit application of the structure over a stub hub, or within a hollow blind recess or bore (FIG. 3) of the shaft (5).

6 Claims, 3 Drawing Figures

DUAL COUNTERACTING HUB-TO-SHAFT CLAMP CONNECTION

CROSS REFERENCE TO RELATED PATENT

U.S. Ser. No. 06/116,309, filed Jan. 28, 1980, PETER et al now Pat. No. 4,235,573.

The present invention relates to a hub-to-shaft clamp connection using conical surfaces engaging conical clamping elements, in which two axially adjacent clamping elements are used, with the conical surfaces diverging in opposite direction, to provide for dual counteracting clamping in which axial forces are self-compensated upon tightening the connection.

BACKGROUND

Various types of hub-to-shaft connections are known in which clamping bolts, arranged uniformly circumferentially around a clamping ring, provide for axial movement of clamping cones to cause radial pressure being placed between a hub and a shaft, and thus provide for engagement of the hub and the shaft for transmission of torque. Clamping connections of this type are described, for example, in German Pat. No. 1,099,806, to which, roughly, U.S. Pat. Nos. 3,679,247 and 3,847,495 correspond. Clamp connections of this type have the advantage with respect to other clamping connections that there is no shifting of the inner and outer clamping rings on the shaft, or in the bore of a hub, respectively, when the connection is being tightened. Thus, exact alignment and angular adjustment of the hub with respect to the shaft is possible. Since no axial shifting occurs between the hub, the shaft, and the clamping cell upon tightening, the frictional forces are also decreased so that, in effect, only those forces within the clamping cell which arise between the clamping rings and the operatively connected double-conical clamping rings will be applied, and all the forces will be available for transmission of torque. The only force which has to be overcome, thus, is frictional force at the clamping side. The angles of the conical clamping rings are so selected that they are above the self-retaining angle so that the clamping set can be loosened after release of the axial clamping forces, that is, after loosening of clamping bolts.

One type of clamping set which has been found particularly useful is the spring ring clamping set. One disadvantage has been noted, however, that it can be used only to attach a shaft to a rotary element which is formed with a hub. Other connections, for example to directly connect a hollow shaft to a rotary element, or a projecting hub portion on a shaft, cannot be secured by this set. A spring ring clamping set cannot be used, for example, with a hollow shaft, or in a cylindrical blind bore of a shaft which is to be spread over a rotary element since the axially slit thin-walled conical clamping rings cannot accept the radial forces which arise upon clamping. If the clamping set is to be used externally on a projecting stub of a rotary element which is to be compressed over a shaft, such spring ring clamping sets likewise cannot be used since the radial tension forces which arise cannot be accepted by the axially slit thin-walled conical outer rings. It is thus necessary to have different types of clamping sets for various specific uses; this is expensive, requires stocking of many different parts, and thus is uneconomical. Clamping rings of these types are, therefore, primarily suited for direct hub-to-shaft connection of standard sizes in which large quantities can be made. Clamping systems of this type are shown in the aforementioned German Pat. No. 1,009,806, to which U.S. Pat. Nos. 3,679,247 and 3,847,495 generally correspond; and in German Pat. No. 1,294,751, to which U.S. Pat. No. 3,972,636 corresponds, as well as in German Pat. No. 2,147,501, to which U.S. Pat. No. 3,776,651 corresponds.

The Invention

It is an object to provide a universally applicable clamping set which is simple in construction and can be used for various types of hub-to-shaft connection.

Briefly, the structure of the invention uses an inner ring formed with outer conical surfaces, an outer ring formed with inner conical surfaces, and axially split clamping rings having double conical surfaces fitted between the conical surfaces of the inner and outer ring. The double conical rings can be axially tightened against each other to provide for radially or diametrically directed forces. The inner or outer rings, respectively, are axially slit so that they can be readily applied within a hub and about a shaft.

In accordance with the present invention, a circumferentially continuous cylindrical metal ring is fitted, depending on use, either within the inner, axially split double cone ring, to accept inwardly directed radial compressive forces, or an outer, circumferentially continuous ring is placed over the outer double conical, axially split ring. The respective inner or outer ring is formed with a circumferentially continuous groove, preferably of cylindrical surface, within which the respectively inner or outer axially split double conical ring can be snapped, so that the axial position of the respective elements will be maintained, and the parts held together in irremovable form so that they will not get lost or can shift with respect to each other during tightening.

The structure has the advantage that a single universally applicable double acting clamping connection is provided which can be used, advantageously, to transfer torques in various ways, for example between a hub and a shaft, with a hollow shaft, or in a cylindrical blind bore of the shaft, or for use with hubs which have axially extending stub projections which are to be tightened over a shaft, similar to a shrink fit; in distinction to a shrink fit, however, the hub-to-shaft connection can be loosened. The clamping set can be made in various dimensions and under mass production conditions so that it can be inexpensively provided. A lesser number of parts need be stocked, and adaptation of the connection to shafts or hubs of various sizes is simple.

DRAWINGS

Figure 1:
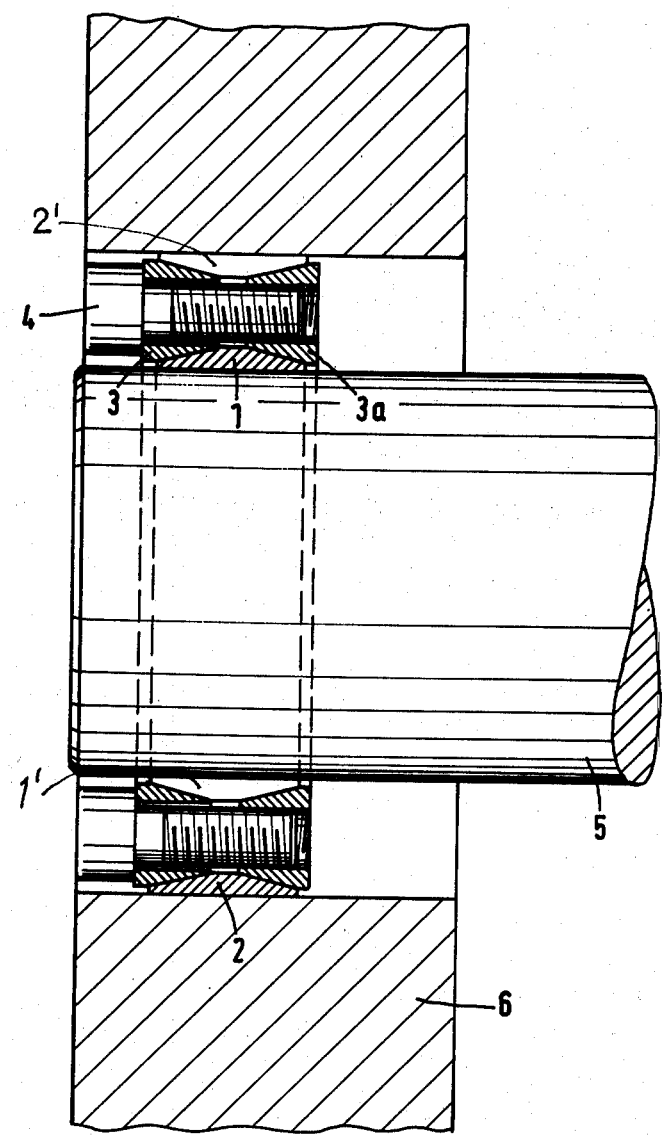
FIG. 1 is an axial part-sectional view through a hub-to-shaft connection in accordance with the prior art, in which two double conical rings are seated on axially slit inner and outer rings, respectively, fitted between a shaft and a hub.

The clamping set is similar to that known and illustrated in FIG. 1. An axially slit inner double conical ring 1 has outer conical surfaces. An axially slit outer conical ring 2 has inwardly directed conical surfaces. The rings are preferably so arranged that the axial slits 1', 2' are 180° offset, as shown in FIG. 1. Two double conical compression or clamping rings 3, 3a are fitted between the inner ring 1 and the outer ring 2. Clamping bolts 4, preferably six or more and uniformly arranged circumferentially about the axis of the shaft, pass through the outer compression ring 3 and are tapped into the inner compression ring 3a. The bolts 4, before use, hold the ring assembly together. Upon tightening of the bolts 4, the double conical rings 3, 3a will be moved axially towards each other, providing for diametrical or radial forces being applied between the shaft 5 and a hub 6 for transmission of torque.

Figure 2:
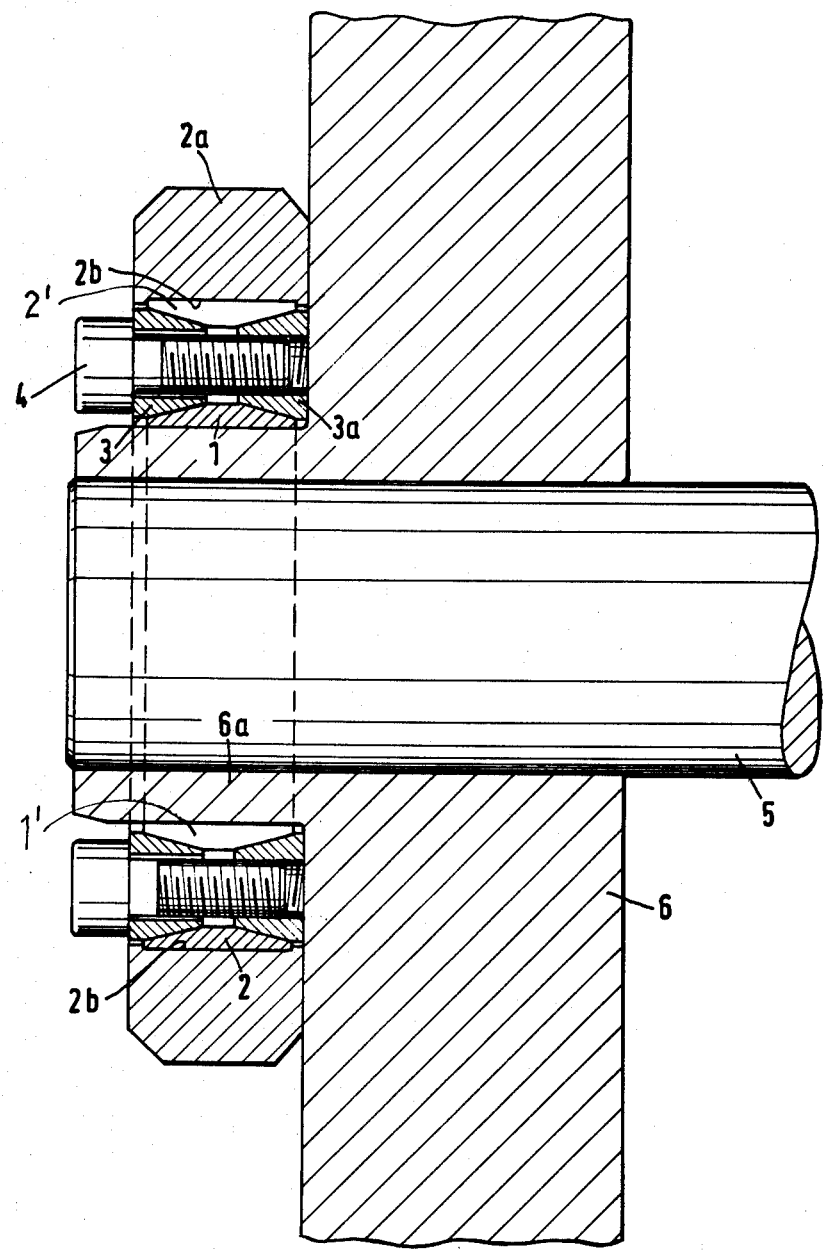
FIG. 2 is a view similar to FIG. 1 illustrating the structure in accordance with the present invention and applied as an external clamp on an axial projection of a hub of a rotary element, for example a wheel.
Figure 3:
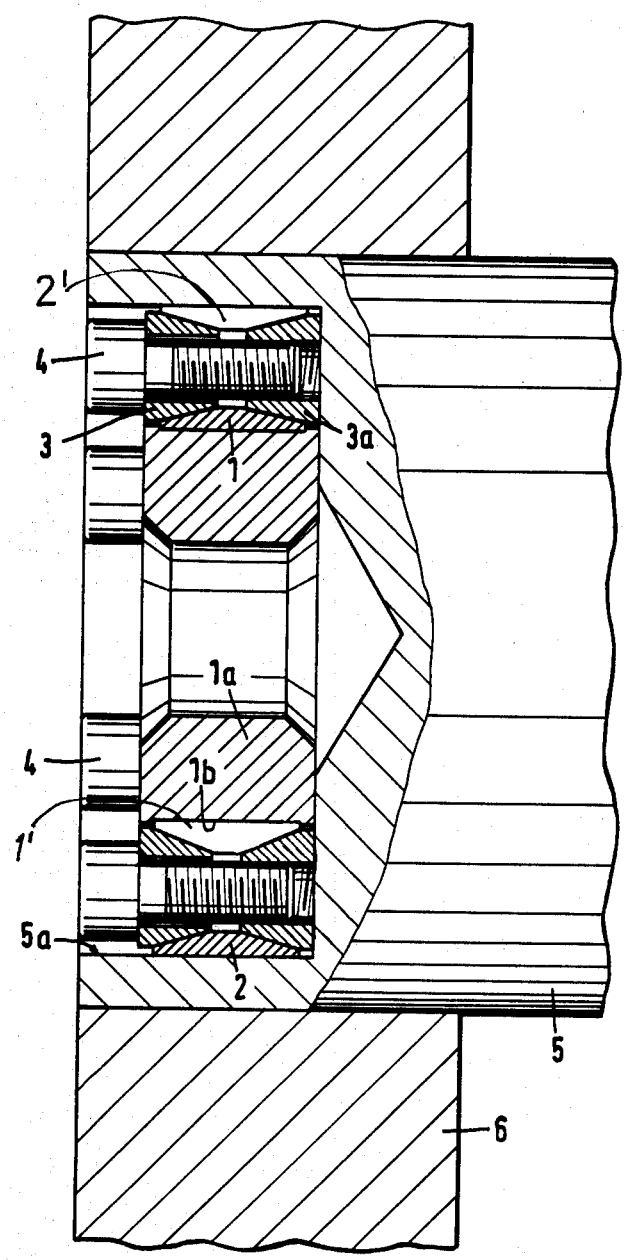
FIG. 3 is a view similar to FIG. 1 and illustrating the structure in accordance with the present invention and applied to a hollow blind bore portion of a shaft.

The invention will be described first with reference to FIG. 2, to provide inwardly directed compressive forces. The embodiment of FIG. 3 is similar to that of FIG. 2, except that the force direction is reversed, that is, is radially outwardly. Elements similar to those previously described have been given the same reference numerals.

In accordance with the invention, an outer ring 2a is placed over the axially slit outer double conical ring 2. Preferably, the ring 2a is made of a material which can accept high tensile forces, such as high-strength steel. The ring 2a is formed with a circumferentially continuous groove 2b having a cylindrical surface. The outer axially slit double conical ring 2 fits into the groove 2b, as best seen in the lower diametrical position of FIG. 2. The clamping connection having the elements 1, 2, 3, 3a and bolts 4, together with the outer metal ring 2a, is seated on an axial stub projection 6a of the rotary element, for example a wheel or a hub 6. Upon tightening of the bolts 4, the projections 6a will be tightly clamped on the shaft 5. Ring 2a, made of highstrength material, can accept radially outwardly directed forces.

The structure of FIG. 3 is similar, except that the clamping forces are now radially outward, and the counter forces have to be accepted by a radially inwardly positioned ring 1a. The clamping assembly 1, 2, 3, 3a, 4 is positioned within a blind bore or recess 5a of shaft 5, and located in axial alignment with the rotary element, for example wheel 6. The double conical inner ring 1, axially slit at 1', is seated with an inner cylindrical surface within a cylindrical groove 1b formed in the inner ring 1a. The inner ring 1a now can accept radial forces which arise upon clamping or tightening of the bolts 4.

Operation

Upon tightening of the bolts 4, preferably Allen head bolts, of which at least six are located in planetary arrangement, counter-directed movement is imparted to the two clamping or compression rings 3, 3a, permitting the axially slit double conical inner ring 1 to provide inwardly directed radial pressure, and the axially slit outer ring 2 to provide radially outwardly directed pressure. Depending upon the application—direct clamping on the shaft (FIG. 1), clamping pressure is applied between the shaft 5 and the hub 6 directly; or, in accordance with the present invention, clamping pressure is applied over the stub projection 6a on shaft 5 (FIG. 2) or the blind bore 5a of a shaft 5 (FIG. 3). Substantial torque can be transferred upon application of axial clamping forces by the bolts 4, which will result in radially or diametrically directed forces being applied, the counter forces being accepted, respectively, by the rings 1a (FIG. 3) or 2a (FIG. 2). The connection can be released upon releasing bolts 4 permitting removal of the respective rotary element 6 from the shaft 5.

Various changes and modifications may be made within the scope of the inventive concept.

A steel of min. 18% C has been found particularly suitable for the ring 2a (FIG. 2), since it has high tensile strength; a steel of min. 18% C also is particularly suitable for the ring 1a (FIG. 3) since it is particularly strong resisting compressive and shear force. The minimum tensile strength of the alloyed steel should be $\sigma_B = 70$ kp/mm$^2$.

I claim:

1. Dual counteracting hub-to-shaft clamping connection having
   an axially split (1') inner ring (1) formed with outer conical surfaces having the apex from the cone surfaces intermediate the length thereof;
   an axially split (2') outer ring (2) formed with inner conical surfaces having the apex from the cone surfaces intermediate the axial length thereof;
   a pair of clamping or compression rings (3, 3a) having double conical surfaces fitting between the inner conical surfaces of the outer ring (2) and the outer conical surfaces of the inner ring (1);
   and circumferentially uniformly positioned clamping bolts passing axially through said axially outer one (3) of the clamping rings and into the axially inner one (3a) of said clamping rings to tighten the rings over said conical surfaces against each other and thus provide for diametrically directed forces being applied to said rings,
   and comprising, in accordance with the invention,
   a circumferentially continuous cylindrical metal ring (2a) formed with a circumferentially continuous groove (2b) in the inner circumferential surface thereof, fitted over the axially split outer ring (2), said axially split outer ring being seated in said groove.

2. Dual counteracting hub-to-shaft clamping connection having
   an axially split (1') inner ring (1) formed with outer conical surfaces having the apex from the cone surfaces intermediate the length thereof;
   an axially split (2') outer ring (2) formed with inner conical surfaces having the apex from the cone surfaces intermediate the axial length thereof;
   a pair of clamping or compression rings (3, 3a) having double conical surfaces fitting between the inner conical surfaces of the outer ring (2) and the outer conical surfaces of the inner ring (1);
   and circumferentially uniformly positioned clamping bolts passing axially through said axially outer one (3) of the clamping rings and into the axially inner one (3a) of said clamping rings to tighten the rings over said conical surfaces against each other and thus provide for diametrically directed forces being applied to said rings,
   and comprising, in accordance with the invention,
   a circumferentially continuous cylindrical metal ring (1a) formed with a circumferential continuous groove (1b) in the outer circumferential surface thereof fitted within the axially split inner ring (1), said axially split inner ring (1) being seated in said groove (1b).

3. Clamping connection according to claim 1, wherein the outer ring (2) is formed with an outer cylindrical surface, and the groove (2b) in said continuous cylindrical metal ring (2a) has a cylindrical surface receiving said cylindrical surface of the outer axially split double conical ring (2).

4. Connection according to claim 2, wherein the inner ring (1) is formed with an inner cylindrical surface;

and the groove (1b) in the circumferentially continuous cylindrical metal ring (1a) is cylindrical and receives the cylindrical surface of the inner ring (1).

5. Connection according to claim 1 or 2, wherein the axial length of said circumferentially continuous cylindrical metal ring (1a, 2a) is longer than the axial length of the respective axially split ring (1, 2) fitted in the groove (1b, 2b) of said circumferentially continuous cylindrical metal ring.

6. Connection according to claim 1 or 2, wherein the continuous cylindrical metal ring (1a, 2a) is high-strength steel.

* * * * *